United States Patent
Wiljan et al.

(10) Patent No.: US 8,215,574 B2
(45) Date of Patent: Jul. 10, 2012

(54) PULPER WITH A TORQUE MOTOR

(75) Inventors: Harry Wiljan, Munich (DE); Roland Carra, Munich (DE); Stefano Bozano, Genoa (IT)

(73) Assignees: BTA International GmbH, Pfaffenhofen (DE); Biotec Sistemi S.R.L., Serra Rico (IT)

( * ) Notice: Subject to any disclaimer, the term of this patent is extended or adjusted under 35 U.S.C. 154(b) by 107 days.

(21) Appl. No.: 12/845,602

(22) Filed: Jul. 28, 2010

(65) Prior Publication Data
US 2011/0024534 A1 Feb. 3, 2011

(30) Foreign Application Priority Data
Jul. 29, 2009 (DE) .......................... 10 2009 035 247

(51) Int. Cl.
*B02C 23/36* (2006.01)
(52) U.S. Cl. .......................... 241/30; 241/36; 241/46.17
(58) Field of Classification Search .................. 241/30, 241/46.17, 36, 101.2, 69, 73
See application file for complete search history.

(56) References Cited

U.S. PATENT DOCUMENTS

| 4,283,275 A | 8/1981 | Heinbockel |
| 7,168,640 B2 * | 1/2007 | Lipowski ........................ 241/36 |
| 7,469,850 B2 * | 12/2008 | Lipowski et al. .......... 241/101.2 |
| 7,757,983 B2 * | 7/2010 | Lipowski et al. ............... 241/36 |

* cited by examiner

*Primary Examiner* — Mark Rosenbaum
(74) *Attorney, Agent, or Firm* — Chernoff, Vilhauer, McClung & Stenzel

(57) ABSTRACT

The invention relates to a pulper and to its method for recycling wastes and/or product residuals. The pulper comprises a tank is which a rotor is provided for defibrating the stock mixture to be recycled, as well as a screen for drawing off the defibrated outfeed from the tank, the rotor being powered by an electric motor comprising a drive shaft in active transmission with the rotor. In accordance with the invention the electric motor is configured as a three-phase synchronous motor for operation in a speed range from 0 to 1000 rpm. It is connected to the output of a frequency inverter controlled by a controller, the output of the drive shaft being directly connected to the rotor.

7 Claims, 2 Drawing Sheets

PULPER WITH A TORQUE MOTOR

Figure 1:
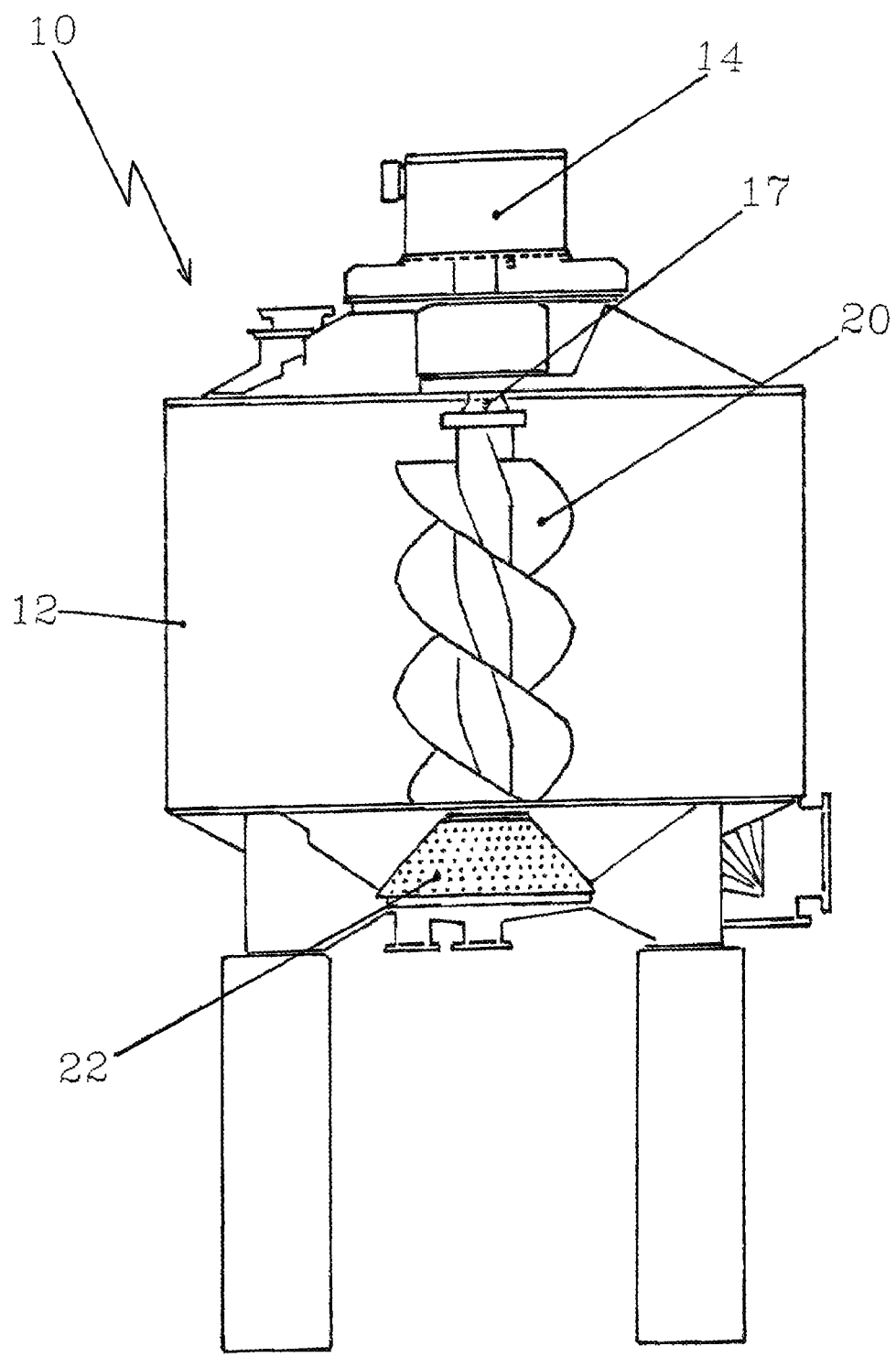

The invention relates to a pulper and to a working method of same.

Pulpers have the task of recycling readily defibratable stock mixtures, one salient application being recycling especially waste products such as, for example, waste paper and similar waste, including biological waste by separating the recyclable from the non-recyclable components.

One such pulper usually comprises a tank housing a rotor into which the feedstock to be recycled is filled together with a liquid, usually water. Powered rotation of the rotor creates strong flow forces defibrating the solids, lending themselves thereto along with a shortening of the defibers, resulting in part thereof and other substances contained in the stock mixture entering into solution. However, since this mainly involves defibratation no special mention is made as to the accompanying size-reduction and dissolution in the present context, but it is understood to be included.

The defibrated components of the feedstock form together with the liquid a suspension which is drawn off from the pulper e.g. through a screen.

The basic system of such a pulper is described in German patent DE 31 49 135, it essentially comprising a pulper tank with an electrically powered bottom rotor. It is also known from prior art to power the rotor hydraulically by supplying the rotational torque of an induction motor via a hydraulic pump/motor to the rotor, in addition to which, use is made of rectangular gearing powered with the aid of the induction motor. In addition to the drawback common to high maintenance costs and poor efficiency, geared power drives have the disadvantage of being a very heavy lop-sided weight load, along with numerous bearings and couplings involved, each constituting a weak point mechanically. On top of this, such motorized systems are noisy. This is why in prior art clustered motors, usually involving four motors, are proposed. However, despite being compact and positionably centered on the rotor of the pulper so that the clustered weight is centered on the pulper and its tank, each of the interconnections of the motors involves friction losses, apart from the drawback of the mechanical weak points, for instance, of the bearings, still not being solved despite the clustered approach.

In accordance with a further concept of a pulper the drive train comprises an electric motor followed by traction gearing, for example a belt drive. Although this approach achieves the use of rotors for speeds ranging from approx. 200 rpm to 500 rpm by means of a simple drive arrangement, very large expensive pulleys are needed. Since these large pulleys have a high moment of inertia a coupling limiting or separating the load is needed at or in the hub between the shaft and the pulley, preferably a slip clutch, to prevent the rotor becoming fractured. Even at low speeds a double belt drive is needed which, although achieving a very high rotor torque, necessitates dimensioning the drive elements accordingly which makes such a concept very intensive not only as to the costs but also as to the maintenance involved, aside from the disadvantage of adding to the footprint of the pulper.

The object of the invention in overcoming these drawbacks is to propose a suitable assembly for driving the rotor of a pulper. This object is achieved by a pulper as set forth in claim 1 and a pulper method as set forth in claim 3.

The pulper in accordance with the invention is characterized in that the drive assembly now comprises a three-phase synchronous motor designed as a multipole synchronous motor, comprising to advantage 12 to 64 poles running at a speed ranging from 0 to 1000 rpm, where necessary, reversed. In this arrangement, the motor is connected to the output of a frequency inverter controlled by a controller and the output of the drive shaft is directly transmitted to the rotor shaft without any gearing inbetween. This achievement now results in no element of the drive train transmitting a torque and/or force rotating faster than the drive shaft or output thereof. For the active transmission between the output of the drive shaft and the rotor shaft, the former is provided with a drive shaft at the motor end directly coupled to the latter to thus now make it possible to use the rotor shaft of the pulper as the shaft driving the motor, in other words, the output of the drive shaft of the motor already constitutes the rotor shaft.

This configuration of the pulper in accordance with the invention has salient advantages over the features of conventional pulper devices. For, now, by using a synchronous motor in conjunction with an upstream frequency inverter the torque made available at the rotor of the pulper can be maximized over the full speed range, facilitating the starting phase in also enabling the device to be started under load. It is namely so, that in slow rotation of the rotor the pulp stock mixtures tend towards an internal no-flow condition which can cement or plug the rotor and its vanes solid. It is particularly advantageous to start the rotor as a function of the frequency with direct rotor drive by adapting to the structural viscosity of the pulp subsequent to such a resting phase. The torque in starting the rotor is likewise elevated by the increase in viscosity as a requirement which the invention is able to satisfy particularly suitably.

Now that the speed can be set flexibly depending on the phase of operation involved, there is no need for any gearing in thus eliminating the majority of the moment of inertia otherwise involved in the drive assembly, this in turn diminishing the risk of damage to the drive train itself and to the rotor should it suddenly become plugged. Furthermore, there is now no need for the otherwise usual protective coupling features such as slip clutches, powershift or shear pin couplings. With conventional pulpers the rotor and thus its drive train is exposed to massive impact when the feedstock includes solids incapable of being defibrated. Whilst these gyratory masses of conventional drive trains have a very unfavorable effect, they are fully damped in the magnetic field of the synchronous motor and are prevented from reaching the gearcase of the motor. The reduction in the number of machine elements involved greatly enhances the overall efficiency of the drive train in thus saving energy. Apart from this, due to these few components the drive train is relatively lightweight and practically maintenance-free. And since the power is transmitted without contact in the synchronous motor and because the main drive motor only rotates as fast as the rotor itself, this drive train excels by near silent running. In addition to this, directly coupling the synchronous motor to the rotor makes for a small footprint of lesser bulk and weight as compared to conventional pulpers, thus making the pulper in accordance with the invention particularly suitable for mobile applications. The connection of the synchronous motor to the direct coupling of the drive train at the pulper rotor now makes it possible furthermore for the pulper to respond to changing operating conditions near instantly in adapting the drive train to the change in the operating conditions. This is because the drive train has a low moment of inertia and by means of the controller the speed and/or torque can be altered very simply.

Thus, the gist of the invention is to couple a variable-speed synchronous motor directly, i.e. without gearing and without machine-powered components, to a rotor of a pulper. Whilst maintaining a maximized torque the speed can now be adapted to the operating conditions or also the torque tweaked to comply therewith.

To prevent the rotor becoming plugged in operation, means for sensing the load current as well as means for sensing rotation of the drive shaft of the synchronous motor may be provided, to the outputs of which the controller is connected to enable it to instantly react to a change in the operating conditions. As soon as the rotor becomes plugged, the current consumption increases as sensed by the controller, enabling a motor parameter to be tweaked, for example, changing the speed of the drive shaft to agree with the change in the operating condition. Furthermore, once the disturbance in the feedstock has been remedied, followed by the controller sensing a reduction in the current consumption of the motor, the device can be returned to its previous target parameter.

As already explained, combining the three-phase synchronous motor connected to a frequency inverter with a gearless direct coupling to power a pulper rotor enables it to react instantly to any change in the operating conditions so that in many cases any tendency of the pulper to become plugged can already be sensed. However, even should the pulper in accordance with the invention become plugged, its low moment of inertia and, because of the speed of the complete drive train being variable, endow it with the advantage that any plugged operation of the rotor can now be easily overcome by causing the drive shaft to shake in response to the actual load current and/or actual rotary situation to advantage.

The power rating of the motor ranges from 10 to 500 kW.

The object of the method of the invention is achieved by a method for operating a pulper as described above in which, starting with the rotor stationary, the speed of the synchronous motor is increased to a predefined target rpm by making use of a predefined load current limit with a substantially constant motor torque, whereby any tendency of the drive shaft to become plugged automatically prompts a reversal in the direction of rotation of the drive shaft for a predefined period of time or speed within the load current limit before being returned to the forwards speed. Since this can happen instantly on sensing an increase in the load current, because of the reduced moment of inertia, any risk of the pulper becoming plugged is now effectively diminished or prevented.

Enabling the rotor to be reversed with the aid of the selected torque motor is an advantage in handling the feedstock of the pulper by speeding up solubilizing the more problematic defibratable stock mixtures.

So as not to overload the motor, it may be provided for that the speed is automatically reduced when a predefined load current limit is exceeded and automatically returned its target value once the overload situation has been compensated.

It is basically provided for that the motor can be activated as predefined in response to certain operating conditions to prevent, for one thing, the rotor shaft from becoming plugged and, for another, the motor from being overloaded. More particularly, it may prove necessary in application of the pulper in accordance with the invention in a process chain to regulate its throughput by maintaining it constant, for example. For this purpose, parameters such as weight, volume or moisture content of the feedstock can be sensed for open or closed loop control of the speed of the synchronous motor.

In the method in accordance with the invention it may also be provided for that a power feeder assigned to cover the full speed range of the synchronous motor is controlled as a function of the current consumption of the synchronous motor.

Figure 2:
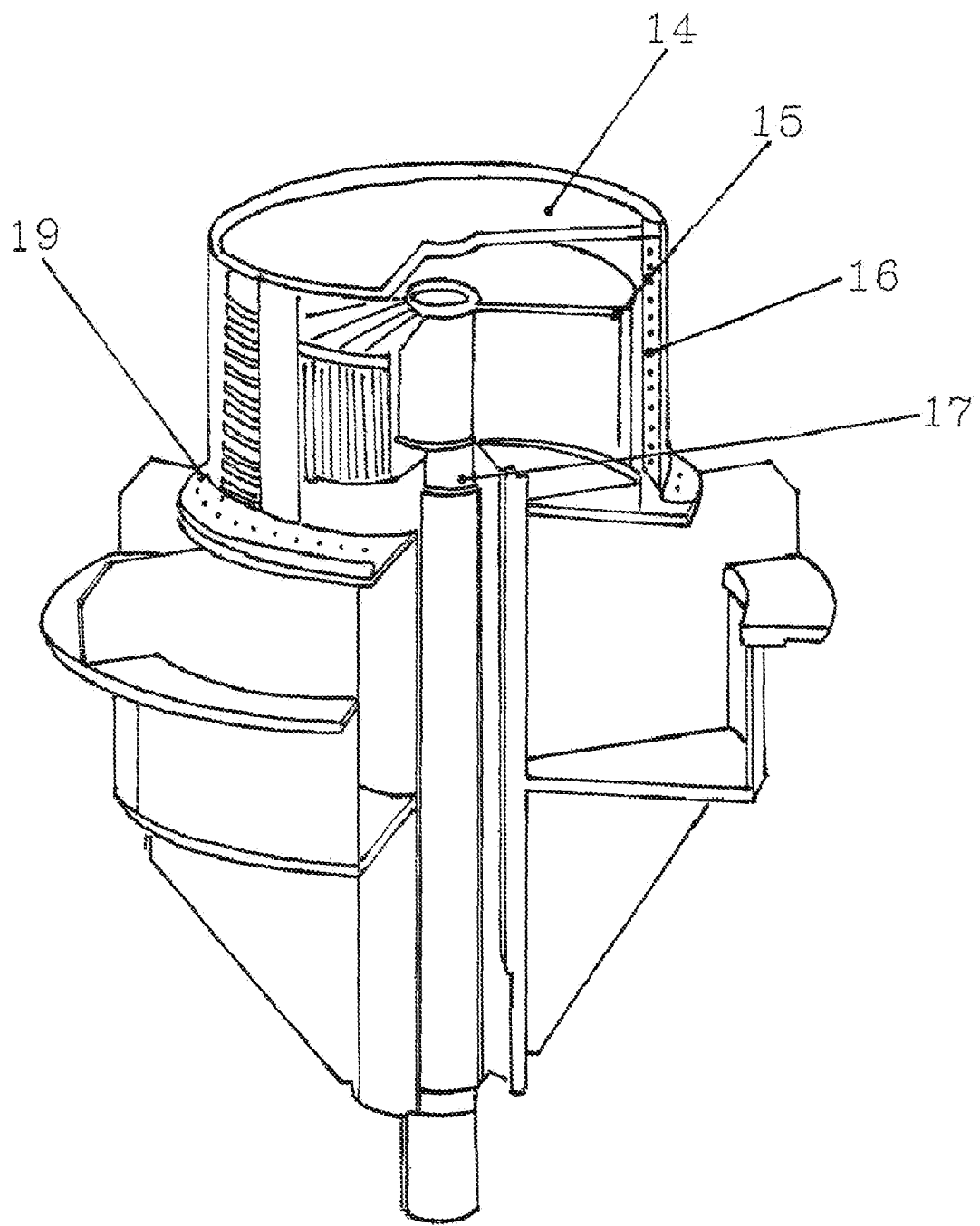

The invention will now be detailed with reference to the attached drawings in which FIG. 1 is a diagrammtic view of a pulper including a torque motor and FIG. 2 is a magnified detail of how the pulper rotor is connected to the torque motor.

Referring now to FIG. 1 there is illustrated the pulper identified in general by the reference numeral 10. Housed in the cylindrical pulper casing 12 mounted centrally therein is a pulper rotor 20, bottomed by a screen 22 passing only a substance well defibrated and solubilized. The rotor 20 is powered by means of a three-phase synchronous motor, the motor casing 14 of which tops the pulper casing 12 centrally to which it is flanged 19 (see FIG. 2). The pulper is bottomed by outfeeds for removing the pulper content.

Referring now to FIG. 2 there is illustrated in a magnified detail how the torque motor is flanged to the pulper casing by means of flange 19. Evident from the section through the motor casing 14 is the stator 16 and rotor 15 of the motor. In the connecting portion 17 the output shaft of the motor is connected to the shaft of the pulper rotor.

List Of Reference Numerals 10 pulper
12 pulper casing
14 torque motor casing
15 motor rotor
16 motor stator
17 connecting portion of motor shaft and rotor
19 mounting flange
20 rotor
22 screen

The invention claimed is:

1. A hydrodynamic pulper for recycling wastes and/or product residuals comprising a tank in which a rotor is provided for defibrating a wet stock mixture to be recycled, as well as a screen for drawing off the defibrated ouffeed from the tank, the rotor having a rotor shaft and being powered by an electric motor having a drive shaft in active transmission with the, rotor shaft,
   wherein the electric motor is configured as a three-phase synchronous motor for operation in a speed range from 0 to 1000 rpm connected to the output of a frequency inverter controlled by a controller, the output of the drive shaft constituting the rotor shaft.

2. The pulper as set forth in claim 1, wherein the controller is connected to the output of a means for sensing the load current and to the output of a means for sensing rotation of the drive shaft output of the three-phase synchronous motor and, when the rotor is plugged, the controller activating the frequency inverter to reciprocate the drive shaft output in response to the actual load current and/or the actual rotary position of the drive shaft output such that the plugged rotor is caused to shake.

3. A method for operating a pulper as set forth in claim 1, wherein in a first phase in starting operation with the rotor stationary the speed of the synchronous motor is controlled up to a predefined target speed in exploiting a predefined load current limit with a substantially constant motor torque with a controlled power reversal when the drive shaft output is sensed plugged, followed by a return to forwards power after having sensed a reversal of the drive shaft output for a predefined period of time or speed at the load current limit.

4. The method as set forth in claim 3, wherein in a normal operation phase the frequency inverter is activated by the controller to maintain a predefined target motor speed of the synchronous motor in maintaining the predefined load current limit, the speed being reduced as soon as the load current limit is exceeded and returned controlled to the target speed as soon as the overload operation phase is terminated.

5. The method as set forth in claim 4, wherein in response to sensing the drive shaft output plugged in the normal operation phase the power is reversed, after which following sensing reverse rotation of the drive shaft output for a predefined period of time or up to attaining the set reversal speed at the load current limit, the power is returned to forwards operation.

6. The method as set forth in claim 3, wherein the drive shaft output, after sensing standstill in reverse rotation thereof, is instantly returned to forwards rotation.

7. The method as set forth in claim 3, wherein the direction of rotation of the drive shaft output is reversed repeatedly by exploiting the rotational energy of the rotor and torque of the synchronous motor to shake the rotor in remedying plugging.

* * * * *